United States Patent

[11] 3,561,588

[72] Inventor James R. Nash
 Zionsville, Ind.
[21] Appl. No. 772,997
[22] Filed Nov. 4, 1968
[45] Patented Feb. 9, 1971
[73] Assignee The Dow Chemical Company
 Midland, Mich.
 a corporation of Delaware

[54] INFEED TRAP DEVICE
 13 Claims, 5 Drawing Figs.
[52] U.S. Cl. .................................................. 198/232,
 198/34, 198/30
[51] Int. Cl. .................................................. B65g 43/00
[50] Field of Search .................................................. 198/232,
 32, 31, 30, 34

[56] References Cited
 UNITED STATES PATENTS
2,628,703 2/1953 Fechhimer .................. 198/34
3,162,291 12/1964 Bell .................................. 198/30

Primary Examiner—Richard E. Aegerter
Attorneys—Griswold & Burdick, John L. Spalding and Maynard R. Johnson ABSTRACT: An improved device for guiding the transfer of an article, such as bottle, from a continuous supply conveyor to a discontinuous indexing device, such as a star wheel, is described. The device comprises a pair of opposed guide rails which define an S-shaped path adapted to permit upright articles to pass along the path, while having dimensions and a configuration adapted to prevent fallen articles from reaching the index device by contacting a fallen article on at least three points on two sides thereof. Means for stopping the conveyor or star wheel, or diverting the flow of articles to one or another of a plurality of star wheels are also described.

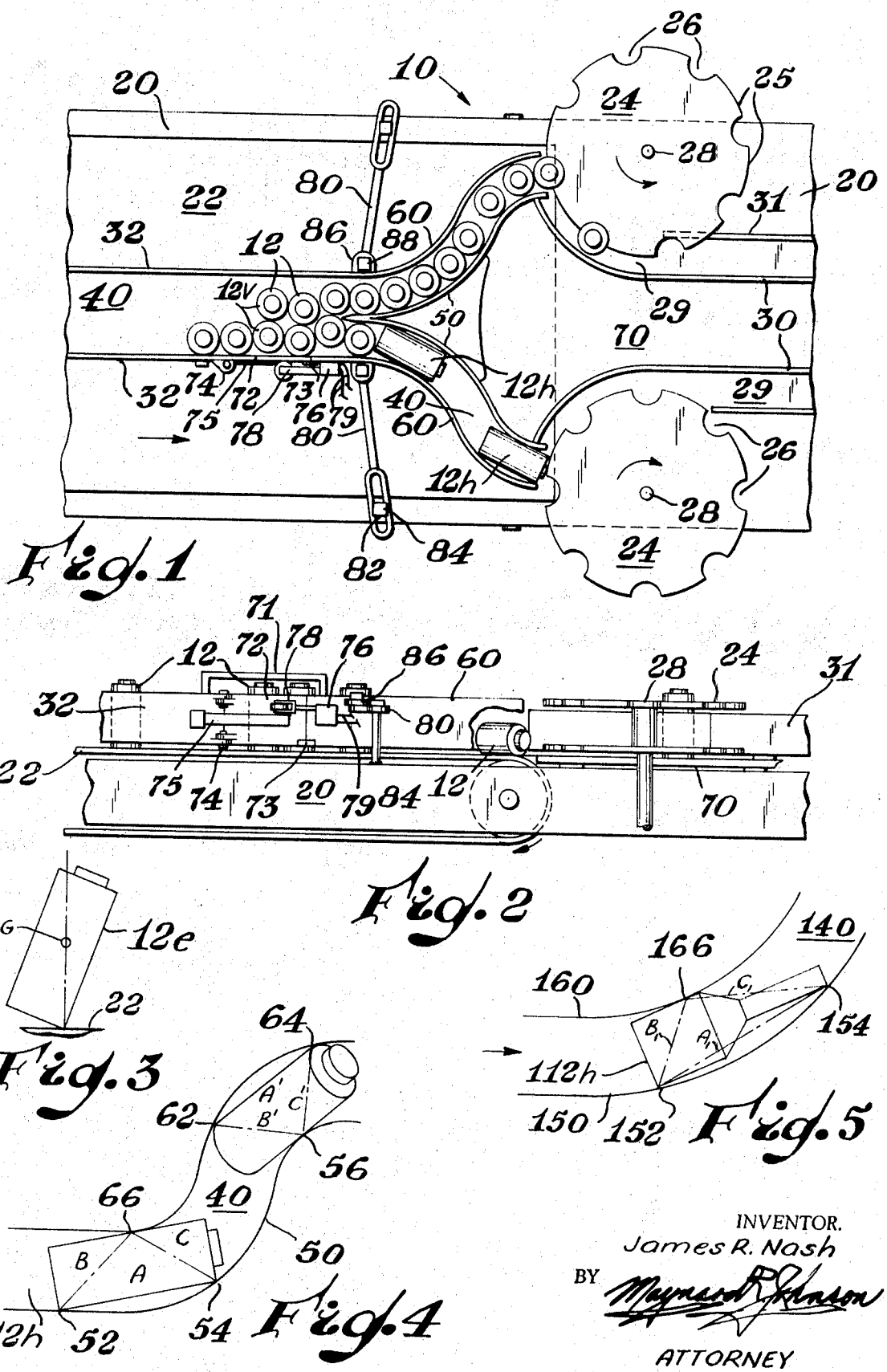

3,561,588

INFEED TRAP DEVICE

BACKGROUND OF THE INVENTION

The invention is directed in general to guide rail means for directing the flow of articles, such as bottles, from a continuous supply source, such as a conveyor, to an indexing apparatus such as a star wheel or pocket wheel. Apparatus where in a continuous supply of articles is fed to an indexing device such as a star wheel are well known in the art and are used in a variety of applications in which it is desired to supply the articles discontinuously, that is in spaced relation to each other or in timed relation, or both, to a device for handling the bottles individually, such as filling apparatus, capping apparatus, stopper-inserting apparatus, individual packing apparatus or the like. Representative devices involving a continuous supply means and a discontinuous index device are described in U.S. Pat. No. 2,910,167, as well as in U.S. Pat. Nos. 2,826,884, 2,789,679 and 2,739,695.

Means for driving the indexing apparatus and the continuing supply apparatus, such as variable speed electric motors, are well known in the art.

In the operation of apparatus involving a continuous supply of individual articles to an indexing apparatus, fallen articles can be fed into the indexing apparatus. In the case of cylindrical articles, for example, such as bottles, there is a continual danger that a fallen bottle may be fed by a conveyor to a star wheel. In such event, the fallen bottle can jam the star wheel and damage the motor driving the star wheel. If the star wheel motor is sufficiently powerful, or if the speed of rotation is great, a fallen bottle can be shattered with a risk of damage to personnel or equipment by broken bottle fragments and with the loss of time required for removal of fragments of the broken bottle from the equipment. The incidence of falling bottles reaching the indexing device can vary depending upon such factors as the speed at which the apparatus is run, the stability of the articles against falling, the presence or absence of foreign material on the surfaces of guide rails and the like which may alter the frictional resistance to movement of the article, and the actual degree of continuity of the supply of articles which can be attained. For example, in the handling of vials of biologicals, it is frequently desirable to employ equipment which can be operated at various rates of speed in order to package material at a substantially uniform volumetric rate regardless of the size of vials employed, and it is also frequently necessary to disinfect the equipment by such procedures as treatment with beta-propiolactone and steam, followed by washing the apparatus with phenol or other disinfectants. The disinfecting procedure, particularly where beta-propiolactone must be employed, tends to leave sticky deposits on the operating surface of the apparatus contributes to the incidence of fallen bottles carried on the conveyor. The containers typically used for biological products such as 3, 5, or 10 milliliter vials have relatively high centers of gravity and are subject to tippage. The almost inevitable presence of spilled liquid products on the operating surfaces of the conveyor, guide rails and indexing apparatus after long periods of operation further increases the risk of fallen bottles arriving at the indexing apparatus. The problem is further increased by increased rates of operation.

For example, at operating rates of 250 articles handled by a single indexing device per minute, if the incidence of fallen bottles is about 0.01 percent, a fallen bottle can be expected at the indexing device about every 40 minutes. However, continued operation of the apparatus leads to a buildup of spilled product material and of disinfectants such as beta-propiolactone, and the like on the operating surfaces. The incidence of fallen bottles can then increase to about 0.1 percent, or one fallen bottle per thousand, and one fallen bottle can be expected every 4 minutes. High speed operation of rotary indexing devices such as star wheels or pocket wheels increases the angular momentum of the article-engaging portions of the indexing device and similarly increases the likelihood of damage and delay resulting from even a single fallen article reaching the index device.

It would be desirable to provide a device which can be utilized in conjunction with a conveyor and an indexing device such as a star wheel to prevent fallen articles transported by the conveyor from reaching the indexing device while permitting erect articles to pass from the conveyor to the indexing device without obstruction.

SUMMARY OF THE INVENTION

The present invention is concerned with apparatus useful in conjunction with conveyor means for continuously moving articles toward a location and discontinuous indexing means for handling the articles individually as they arrive at the location. The invention is particularly directed to apparatus useful for ensuring that articles reaching the indexing device are oriented in a manner suitable for handling by the indexing device, and that articles not so oriented are prevented from reaching the indexing device.

It is an object of the invention to provide a simple device for accomplishing the transfer of articles from a continuous supply source to an indexing device which will prevent the transfer of fallen or misoriented articles to the indexing device. It is a further object of the invention to provide a device of a fail-safe character for preventing the transfer of fallen articles from a conveyor to a rotary indexing device such as a star wheel. Another object of the invention is to provide a simple device for trapping fallen articles fed toward an indexing device, the trap being adaptable to handle articles of varying sizes.

The device of the invention includes a pair of guide rails disposed over a conveyor and adapted to guide the motion of articles moved by such conveyor to the indexing device when the articles are in a vertical, upright orientation. The device includes S-shaped curves in the guide rails adapted to contact and arrest the motion of articles which enter the curves in a horizontal or fallen orientation so that fallen articles cannot pass from the conveyor to the indexing device. The device can further include means for detecting when a fallen article has been so trapped and can also include means for stopping the operation of the indexing device or the conveyor belt or both.

BRIEF DESCRIPTION OF THE DRAWINGS

Further objects and advantages of the invention will be apparent on the consideration of the following description and claims and of the drawings wherein:

FIG. 1 is a plan view of a device of the invention;

FIG. 2 is a side elevational view of a portion of the device of the invention, with a portion of the device broken away to show a fallen article arrested thereby;

FIG. 3 is a schematic view of an article in an unstable equilibrium orientation;

FIG. 4 is a schematic view of the device of the invention arrestingly engaged with a fallen article and with an article in unstable equilibrium orientation illustrated by FIG. 3; and FIG. 5 is a schematic view of a device of the invention arrestingly engaged with a fallen article.

DESCRIPTION OF THE PREFERRED EMBODIMENTS

Referring more particularly to the drawings, the device 10 comprises a base 20 carrying a conveyor 22 for moving articles 12 toward a pair of star wheels 24; parallel guide rail 32 defining a path 40 along the conveyor, and inner and outer curved guide rails 50, 60 defining S-shaped curved portions of the path 40 extending from the parallel guide rails 32 to a location adjacent the indexing devices, or star wheels 24. The device 10 further includes sensing means including a deformable portion 72 of one of the rails 32 and switch means 76 for indicating the arrest of a fallen article 12.

The conveyor 22 is of a conventional type and is operated by drive means such as an electric motor (not shown) to move articles thereon from left to right as shown in FIGS. 1, 2, 4 and 5, or toward the star wheels 24. The indexing devices are star wheels of the conventional configuration which are rotated in the plane of the conveyor on axes 28. The star wheels are normally rotated in the directions shown by the arrows on FIG. 1 by conventional rotary drive means such as an electric motor (not shown). The indexing devices include a series of pockets 26 adapted to receive individual articles 12, the pockets being spaced around the periphery 25 of the pocket wheel. The indexing devices also include slideways 29 for supporting the articles, guide rails 30 for maintaining an article moved by a star wheel in a pocket, and guides 31 for urging an article from a pocket. The slideway 29 of the indexing devices 24 is so disposed in relation to the conveyor 22 so that articles carried by the conveyor are positively transferred into a pocket 26 of the star wheel. In the preferred embodiment illustrated in FIGS. 1 and 2, the conveyor 22 extends partly beyond the periphery 25 of the star wheel so that an article is carried by the conveyor substantially completely into a pocket 26 before it is transferred to the slideway 29. Alternatively, the slideway 29 can extend beyond the periphery 25 of the star wheel or it can be tangential to the star wheel, in which case articles carried by conveyor 22 slide into pockets 26 under their own momentum or under the force exerted by a succeeding article.

As best shown in FIG. 1, parallel guide rails 32 extend continuously into outer curved guide rails 60. Inner curved guide rails 50 are disposed between the outer curved rails 60 to divide the articles 12 moving between the parallel rails 32 into separate streams and conduct each stream along an S-shaped portion of path 40 to a location adjacent a star wheel 24. While the embodiment shown in FIG. 1 has two S-shaped path portions leading to two star wheels, it is understood that the device can be employed in a configuration suitable for a single star wheel or more than two star wheels.

The guide rails 32, 50, 60 are disposed above the surface of conveyor 22, and rails 32, 60 are adjustably mounted with respect to rails 50 to permit selective variation of the disposition of rails 32, 60 in two dimensions. Adjustment of the guide rails to accommodate articles of different sizes requires lateral translation of a set of rails 32, 60 in a direction normal to the direction of motion of the conveyor as well as translation of the same set of rails 32, 60 in the direction of motion of the conveyor, so that the opposed parallel rails 32 remain parallel to each other while the width of a curved portion of path 40 is varied to a substantially uniform degree throughout the length thereof.

An outer curved rail 60 and the corresponding parallel guide rail 32 are preferably of unitary construction. Both are adjustably mounted on base 20 by a brace 80 selectively pivotally attached thereto at a rail mounting bracket 86 by a bolt 88. Each brace 80 includes a slot 82 which is adjustably pivotally secured to the base 20 by a mounting bolt 84. The distance of the guide rails 60, 32 from each other and the distance of outer rails 60 from inner rails 50, and therefore the width of the path 40 can be adjusted to accommodate articles of different sizes by adjusting the position at which the mounting bolts 84 are secured in slots 82 and by pivotally adjusting braces 80 about bolts 84, 88.

A platform 70 is mounted on base 20 between the star wheels 24. Platform 70 carries the pocket wheel guide rails 30, and guides 31. Inner S-shaped rails 50 are mounted above conveyor 22 by attachment to platform 70. The inner rails 50 meet at a junction 51 which is preferably equidistant from parallel rails 32. Junction 51 divides the path 40 into two S-shaped portions each of which lies between a curved rail 50 and a curved rail 60. The two S-shaped portions of path 40 are slightly greater in width than the width of an article 12 to permit erect articles to pass freely between rails 50, 60.

The articles 12 handled by the device of the invention are capable of assuming different orientations and the device of the invention is conveniently described in reference to such orientations. Under normal conditions of operation as illustrated in the upper curved portion of path 40 in FIG. 1, the articles are all in a vertical or erect orientation and have a more or less circular vertical profile 12v. The term "profile" as employed in the present specification and claims refers to the profile of an article 12 as viewed from a point in a plane normal to plane of the conveyor and star wheels 24. In FIG. 1, the articles 12 are bottles having a substantially cylindrical shape, and in their normal erect or vertical orientation they have a vertical profile which is substantially circular. A fallen article viewed in a position in a plane normal to the conveyor 22 has a more or less rectangular profile as illustrated by the bottles 12h. The term "horizontal profile" is employed in the present specification and claims to refer to the profile of a fallen article. It is critical and essential for the operation of the device of the invention that the horizontal profile 12h of an article have a dimension which is substantially greater than any dimension of the vertical profile 12v of an article. For example, when the articles are substantially cylindrical, as in the case of bottles, it is essential that the height of the bottle be substantially greater than the diameter thereof. If the dimensions of the horizontal profile are the same, or less than the dimensions of the vertical profile, such as in the case of a cylinder with a height less than the diameter thereof, the article can pass through the curved portions of the path. In such a case, the fallen article can generally fit within a pocket of a star wheel 24 without jamming against the star wheel rail 30.

As an article falls or tips from a vertical or upright position to a horizontal or fallen position, it rotates through a position in which the article is in unstable equilibrium, with its center of gravity, C.G., immediately above a point of support, as shown in FIG. 3. An article which is tilted past such unstable equilibrium orientation is free to fall to a horizontal or fallen position unless caught. An article in a position of unstable equilibrium will be referred to in the present specification and claims as an article having an "unstable equilibrium profile" as illustrated by the profile of the article 12e in FIG. 4. The unstable equilibrium profile of an article is a projection on the plane of the conveyor 22 of an article oriented in an unstable position. The unstable equilibrium profile has a dimension which is greater than the greatest dimension of the vertical profile, but less than the corresponding dimension of the horizontal.

The dimensions and the configuration of the curved rails 50, 60 are critical and essential to the successful use of the device of the invention in preventing fallen articles from being transferred from the conveyor 22 to the indexing devices 24. In order for upright articles to pass between curved rail 50, 60 it is essential that the rails 50, 60 be disposed at a distance from each other such that the width of the path 40 between the curved rails is at least as great as the smallest dimension of the vertical profile of an article. When the article is substantially cylindrical, such as a bottle, rails 50, 60 are disposed so that the path width is at least as great as the diameter of the vertical profile 12v. The distance between rail 50 and rail 60 is preferably slightly greater than the diameter of the vertical profile so that the article cannot contact both of the curved rails 50, 60 at the same time. The distance between rails 50, 60 is also less than twice the diameter of the vertical profile 12v, so that the articles 12 proceed between the two rails 50, 60 only in single file and less than the length of the horizontal profile of a fallen article, so that a fallen article or bottle can enter a curved portion of path 40 only if its axis is aligned with the rails.

In addition, it is critical and essential that the curved portions of rails 50, 60 be adapted to provide at least 3 contact surfaces adapted to contact three portions of the horizontal profile of an article simultaneously, at least two of the three portions being on different sides of the horizontal profile. As shown in FIG. 4, the curvature of the inner curved rail 50 is such that a fallen article contacts the inner rail 50 at a first locus 52 and a second locus 54 on the horizontal profile thereof. The outer curved rail 60 is so disposed that it contacts another side of the horizontal profile of the article 12h at a third locus 66. An article so contacted by the guide rails 50, 60 at the three loci 52, 54, 66 is arrested by the rails and prevented from moving further along path 40 toward pocket wheel 24. As best shown in FIG. 4, the contact surfaces on the curved rail are so disposed with the relation to the horizontal profile 12h of the article that the contact surfaces of the rails are at the apices of a triangle having a side A between locus 52 and locus 54, a side B between locus 52 and locus 66, and a side C between locus 66 and locus 54. The triangular relationship between the article-contacting or engaging portions 52, 54, 66 of the curved rails 50, 60 must be such that a triangle connecting such three contacting portions is inscribable within the horizontal profile of an article, that is, the apices of such triangle are at least as close as three portions of the horizontal profile.

If the contact surfaces are more distant from each other than the apices of a triangle inscribable within the horizontal profile of an article, a fallen article can pass through the curved portions of path 40 to the star wheel. It is thus essential that the three contact surfaces 52, 54, 66 provided by the curved rails 50, 60 be no more distant from each other than the apices of a triangle inscribable within the horizontal profile 12e of a fallen article, and also that no two contact surfaces 52 and 66, or 54 and 66 provided by different curved rails, be sufficiently near each other to be within the vertical profile 12v of an erect article.

The contact surfaces of the rail 50, 60 are also disposed so that the first and second contact surfaces 52, 54 provided by the same rail 50 are disposed along a line A which forms an acute angle with the direction of motion of an article moved along path 40 as the article enters the curved portion of the path, and so that the first and third contact surfaces 52, 66 which are provided by inner rail 50 and outer rail 60, respectively, are disposed along a line B which extends transversely across path 40 and forms an acute angle with the direction of motion of an object travelling along path 40 into the curve. As a fallen article 12h is moved between a pair of curved rails 50, 60 by the conveyor 22, its leading portions are urged toward rail 60 by the opposed curved portion of rail 50, so that the fallen article rotates in the plane of the conveyor from an orientation in which the length of the horizontal profile is substantially parallel to the direction of motion of the conveyor through an acute angle toward an orientation in which further turning or rotation is prevented by contact of the horizontal profile with rails 50, 60 at the contact portions thereof 52, 54, 66. Such angle corresponds to the angle between line B and the direction of motion. The curved portion of path 40 curves at an acute angle from the direction of the conveyor, the angle of curvature being greater than the angle through which the guide rails permit rotation of a fallen article. The triangular disposition of the contacting portions of the guide rail 50, 60 ensures that a fallen article moving along path 40 will be urged into simultaneous contacting and arresting engagement with all three of the contacting portions 52, 54, 66, preventing further motion thereof along path 40.

When the first and third contact points along path 40 are disposed along a line B which extends across path 40 at an obtuse angle to the direction of motion of an article moved by conveyor 22 into the curve, the article can contact the three contact surfaces at three portions of the horizontal profile without coming into arresting engagement therewith.

Since the width of the horizontal profile corresponds to the width of the vertical profile, when the first and third contact surfaces are disposed on opposite sides of the path along a line normal thereto, the width of the path will be insufficient to permit erect articles to move freely thereon without simultaneously contacting both rails. It is thus critical and essential that the first and third contact surfaces 52, 66 provided by separate rails 50, 60 be on a line which is transverse of the path and forms an acute angle therewith.

It is also desirable to provide the curved portions of guide rails 50, 60 such that they include first and second contact surfaces 62, 64 and a third contact surface 56 which are no more distant from each other than the apices of a triangle A', B', C' inscribable within the unstable equilibrium profile 12e of an article. Such a curved portion of guide rails 50, 60 thus ensures that an article which has tipped sufficiently to reach a position of unstable equilibrium will be contacted and arrested by the guide rails and thus prevented from reaching the star wheel 24.

As illustrated in FIG. 5, the article need not have a substantially rectangular horizontal profile. A noncylindrical fallen article can be similarly arrested in motion along a path 140 by engagement of three portions of its horizontal profile 112h with three contact portions 152, 154, 166 provided by two curved rails 150, 160. Contact portions 152, 154, 166 at least as near each other as the apices of a triangle $A_1$, $B_1$, $C_1$ which is inscribable within the horizontal profile 112h of the fallen article, and portions 152, 154 and 152, 166 lie along lines $A_1$ and $B_1$ which form acute angles with each other and with path 140.

In normal operation, the articles 12 are moved between guide rails 50, 60 by the conveyor 22. It is therefore desirable that the S-curved portions of the path 40 defined by the curved portions of the guide rails 50, 60 be at an acute angle to the direction of travel of the conveyor 22, so that conveyor 22 can exert some motive force in a direction tangential to rails 50, 60 on an article 12 situated anywhere along the curved portion of the path. In order for the rails 32, 60 to be adjustable to accommodate articles of different sizes, the angle of curvature between the curved portions of the rails 50, 60 and the direction of conveyor 22 is no greater than 60°. A maximum angle of curvature of from about 30° to about 50° is preferred.

When the arresting of a fallen article takes place in one curved portion of path 40, the succeeding articles in that portion of path 40 are stopped behind the trapped article. When the curved portion is filled with arrested articles to a portion adjacent the junction 51, articles approaching junction 51 on conveyor 22 are diverted toward the second curved portion of path 40 by the presence of the motionless articles. As additional articles are supplied by conveyor 22 at a rate in excess of the rate at which they can travel along the second, open curved portion, articles continue to back up between rails 32.

The device can also include sensing means for detecting the arrest of the fallen article in a curved portion of path 40. One of the parallel rails 32 includes a deformable rail portion 72, pivotally joined to the rail 32 by hinges 74 to permit movement of rail portion 72 from the opposed parallel rail 32 under the pressure of articles backed up in path 40 behind a trapped fallen article 12h. The portions of rail 32 adjacent deformable portion 72 are of unitary construction or otherwise maintained in parallel alignment with each other by one or more braces 71. Deformable portion 72 is normally biased toward parallel alignment with the adjacent portions of rail 32 by a leaf spring 75 and a stop 73. Stop 73 projects beyond the free end of deformable portion 72 and prevents portion 72 from pivoting into path 40 beyond the inner face of the adjacent portions of rail 32. A conventional microswitch 76 is mounted on an adjacent portion of rail 32, the microswitch 76 having a switch arm 78 normally biased against the outer face of deformable portion 72. Microswitch 76 is adapted to close an electrical circuit through leads 79 when deformable portion 72 is aligned with the adjacent portions of rail 32, and to break the circuit when pivotal movement of portion 72 away from the opposite rail 32 moves the switch arm. The electrical leads 79 are operatively engaged by conventional means with the power supply for the conveyor motor and star wheel motor (not shown). When backed up articles move rail portion 72 and actuate the microswitch 76, both the conveyor 22 and the star wheels 24 are stopped. Preferably, microswitch 76 is adapted to shut down the entire article handling line, and to activate an indicator such as an alarm bell or the like to alert an operator that a stoppage has occurred. The fallen article can be removed and the deformable portion 72 and microswitch 76 manually reset to resume operations.

Alternately, conventional time delay switching apparatus can be employed with a photoelectric sensing device to stop operation of one or both star wheels 24 or of conveyor 22 or to stop operation of the entire apparatus when the sensing device fails to detect the passage of articles for a predetermined time period.

The disposition of the contact surfaces on the curved rails 50, 60 from the star wheel 24 must be sufficient so that the horizontal profile of an article 12h trapped between the guide rails 50, 60 at such contact surfaces does not contact the periphery of the star wheel 24. The curved guide rails 50, 60 must be disposed in spaced relation to a star wheel 24 so that the three contact surfaces nearest a star wheel are sufficiently distant therefrom to prevent an article arrestingly engaged by the three contact surfaces from contacting any portion of the periphery 25 of the star wheel 24. In order to prevent an erect article from moving into a space between the periphery 25 of a star wheel 24 and the star wheel guide rail 30, it is essential that the curved rails 50, 60 be no more distant from the periphery of the star wheel than the smallest dimension of the vertical profile of an individual erect article. When the articles 12 have a substantially circular vertical profile 12v, the curved rails 50, 60 extend to within one article diameter that is, less than 1-article diameter of the periphery of the star wheel. In general, it is preferred that the three contact surfaces nearest a star wheel be spaced therefrom so that the contact surface nearest the star wheel is not more distant therefrom than the greatest dimension of the horizontal profile of an article.

While representative embodiments of the invention have been described for the purpose of illustrating the invention, it will be apparent that various modifications can be made therein. For example, it is preferred that the rails 32, 50, 60 be of a relatively rigid material such as steel; however, somewhat resilient materials can be employed so long as the curved portions of rails 50, 60 be sufficiently unyielding to remain in article-arresting position when a fallen article is trapped thereby. Similarly, the number of curved portions of rails can be varied as can the orientation of the guide rails with respect to the direction of travel of the conveyor, so long as the conveyor can continuously act on an article between a pair of opposed rails to move the same toward the indexing device.

I claim:

1. In a device having conveyor means for continuously moving an article along a path from a first location to a second location, and indexing means for operating on said article in discontinuous fashion when said article is at said second location, the article having a horizontal profile and a vertical profile, a dimension of the horizontal profile being greater than any dimension of the vertical profile, the improvement which comprises:

guide means on the device for guiding an article along the path, the guide means including first and second opposed guide rails, the guide rails including portions curved at an acute angle with the direction of motion of the conveyor means; and first, second and third contact means comprising portions of the guide rails, the contact means being disposed along the path for simultaneously engaging an article at three portions on at least two sides of the horizontal profile thereof so as to prevent the conveyor means from moving an article so engaged, said contact means being so disposed with respect to each other as to prevent the simultaneous engagement of said contact means with the vertical profile of an article, and being disposed at a distance from the index means sufficient to prevent contact between an article arrested by the contact means with the index means, the first and second contact means being disposed at first and second loci respectively on the first guide rail, the third contact means being disposed at a third locus on the second guide rail, such that first, second and third lines connecting the first and second, first and third and second and third loci define a triangle inscribable within the horizontal profile of the article, the first and second lines being at an acute angle with said path and with each other.

2. The device of claim 1 wherein the normal distance from the first rail to the second rail at any locus is greater than the smallest dimension of the vertical profile of the article, and no greater than the lesser of twice the smallest dimension of the vertical profile and the length of the horizontal profile.

3. The device of claim 2 wherein the triangle defined by the first, second and third lines is inscribable within the unstable equilibrium profile of an article.

4. The device of claim 2 wherein the guide rails define an S-curved path from the first location to the second location, said S-curved path having first and second curves therein and first and second sets of contact means are disposed at the first and second curves of said path, the portions of the guide rails nearest the first location and the second location, respectively, being substantially parallel and the intermediate portions of the rails being at an acute angle with said parallel portions.

5. The device of claim 4 wherein the maximum acute angle between a parallel portion and an intermediate portion of a rail is 60°, and wherein one guide rail is selectively adjustably disposed with respect to the other.

6. The device of claim 4 wherein the improvement further comprises means for arresting the conveyor means when an article is arrestingly engaged by the contact means, said means including a deformable portion of a parallel portion of a guide rail.

7. The device of claim 6 further comprising switch means responsive to deformation of the deformable portion of the guide rail, the switch means being operably engaged with the indexing means and the conveyor means for controlling the operation thereof.

8. The device of claim 1 wherein the improvement further comprises means for selectively preventing the movement of a second article along the path when a first article is arrested by the contact means.

9. The device of claim 8 further comprising a second set of guide means including a second set of guide rails for guiding an article along a portion of the path from a junction of the first and second sets of guide means, and means for diverting a second article approaching such junction toward the second portion of the path when a first article is arrested by the contact means disposed in the first set of guide means.

10. The device of claim 9 wherein the means for preventing movement of the second article, and the means for diverting the second article include the contact means on the first set of guide means and a first article arrested thereby.

11. The device of claim 10 further comprising a second indexing means at a second location along the second portion of the path, and a second set of contact means disposed at a second set of loci on the second set of guide rails, and means including the second set of contact means for preventing movement of a second article along the second portion of the path and for diverting an article approaching said junction toward the first portion of the path and the first set of guide means when a first article is arrested by the second set of contact means.

12. The device of claim 1 wherein the guide rail portions curved at an acute angle with the direction of motion of the conveyor are curved at a maximum angle of curvature of from about 30 to about 50°.

13. The device of claim 1 wherein the contact means nearest the index means is spaced from the index means a distance less than the greatest dimension of the horizontal profile of an article.